United States Patent [19]

Culbertson et al.

[11] Patent Number: 5,370,459
[45] Date of Patent: Dec. 6, 1994

[54] SURFACE TEMPERATURE PROBE WITH UNIFORM THERMOCOUPLE JUNCTION

[75] Inventors: David P. Culbertson, Bristol, Wis.; Alfred J. Barrett, Boulder, Colo.; Steven K. Klingemann, Elkhorn, Wis.; Richard E. Voss, Antioch, Ill.

[73] Assignee: Claud S. Gordon Company, Richmond, Ill.

[21] Appl. No.: 73,850

[22] Filed: Jun. 8, 1993

[51] Int. Cl.$^5$ ............................ G01K 1/14; G01K 7/04
[52] U.S. Cl. ...................................... 374/179; 374/208; 136/221; 136/230; 136/201; 29/592.1; 29/595
[58] Field of Search ................ 374/208, 179; 136/221, 136/229, 230, 201; 29/592.1, 595

[56] References Cited

U.S. PATENT DOCUMENTS

| | | | |
|---|---|---|---|
| 3,395,050 | 7/1968 | Senbokuya | 136/221 |
| 3,573,995 | 4/1971 | Senbokuyo | 136/221 |
| 3,751,305 | 8/1973 | Huebscher | 136/221 |
| 4,091,673 | 5/1978 | Tamura et al. | |
| 4,241,289 | 12/1980 | Bowling | 136/221 |
| 4,242,148 | 12/1980 | Remmert | 136/221 |
| 4,265,117 | 5/1981 | Thoma et al. | 136/221 |
| 4,279,154 | 7/1981 | Nakamura | 136/221 |
| 4,355,911 | 10/1982 | Tymkewicz | 374/208 |
| 4,614,443 | 9/1986 | Hamert | 136/221 |
| 4,674,555 | 6/1987 | Plata | 374/179 |
| 4,729,798 | 3/1988 | Nanigian | 374/179 |
| 4,808,241 | 2/1989 | Hollander et al. | 374/179 |
| 4,859,081 | 8/1989 | Kabayashi | 374/179 |
| 4,963,195 | 10/1990 | Kodato et al. | 136/225 |
| 5,176,451 | 1/1993 | Sasada et al. | 374/208 |

FOREIGN PATENT DOCUMENTS

| | | | |
|---|---|---|---|
| 46-25795 | 7/1971 | Japan . | |
| 55-74432 | 6/1980 | Japan . | |
| 0219841 | 9/1986 | Japan | 374/208 |
| 0304556 | 1/1929 | United Kingdom | 374/179 |
| 527778 | 10/1940 | United Kingdom | 136/221 |
| 0932260 | 7/1963 | United Kingdom | 136/221 |
| 0800692 | 1/1981 | U.S.S.R. | 136/221 |

OTHER PUBLICATIONS

"Adding a New Page on the History of Surface Temperature Measurement. That is Model-N-Sensor for Next Century.", Anritsu Meter Co., Ltd., Tokyo, Japan, (date unknown).
"Thermo Electric Catalog", Hand Held Thermocouple Probes, C-15, 1988.
"Surface-Hugging Ribbon Senses Temperature Fast", Design News, Jun. 8, 1992, pp. 133, 134.
"High Specification Thermocouple Probes Model-S", Anritus Meter Co., Ltd., Tokyo Japan, 1989.
"A Breakthrough in Hand-Held Sensor Technology", Hand Held Thermocouples, Watlow Gordon Catalog, p. 75, (pre 1992).
"Temperature Measurement, Instruments and Probes", Anritsu Meter Co. of America, p. 23, 1989.

Primary Examiner—D. Gutierrez
Attorney, Agent, or Firm—Renner, Otto, Boisselle & Sklar

[57] ABSTRACT

A contact-type surface temperature probe which has a generally uniform thermocouple junction. The thermocouple junction is formed by joining each of the thermocouple elements or materials directly to an electrically conductive spring flexure, thus eliminating the need for having to form the thermocouple materials directly to each other. As a result, the thermocouple junction of the present invention has a more uniform or smooth contour for better contact with the surface without having to remove burrs or other non-uniformities.

30 Claims, 2 Drawing Sheets

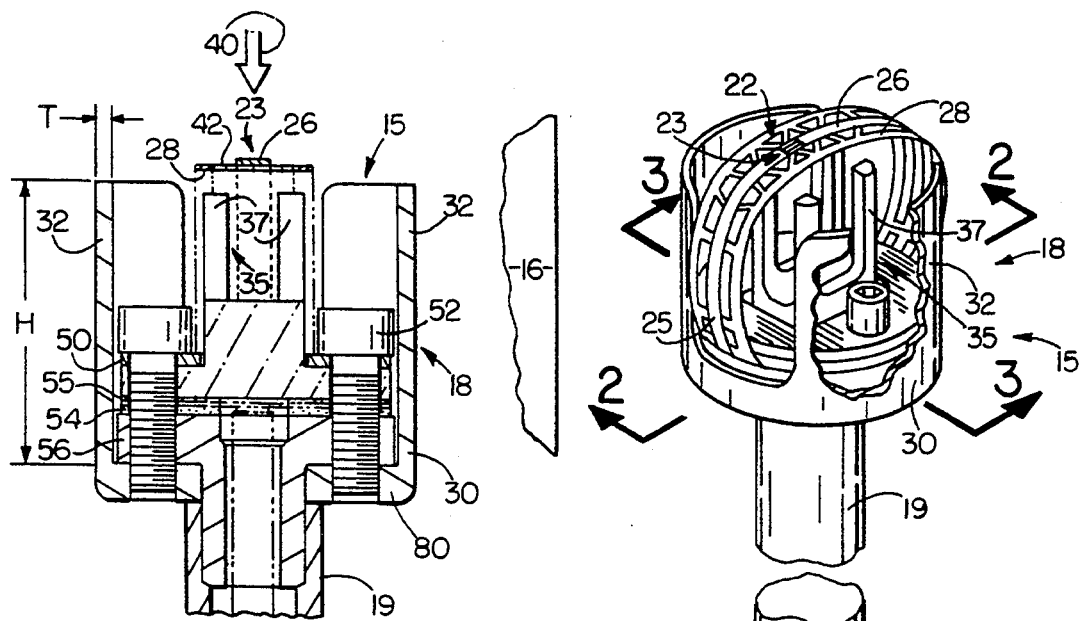
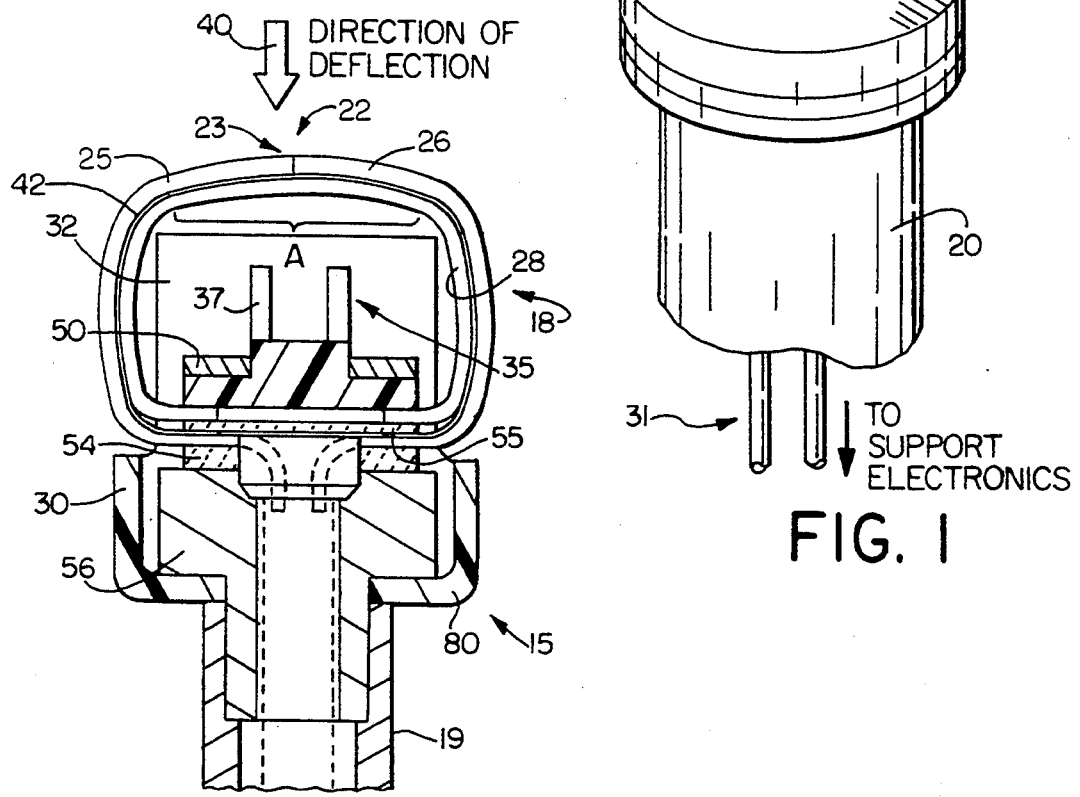

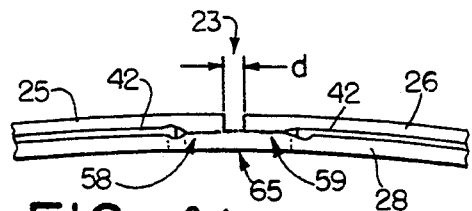
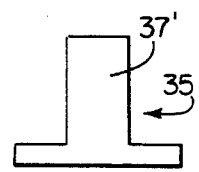
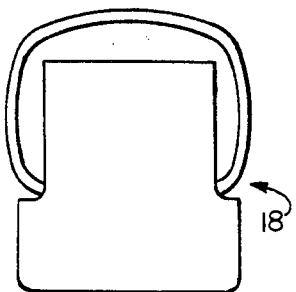
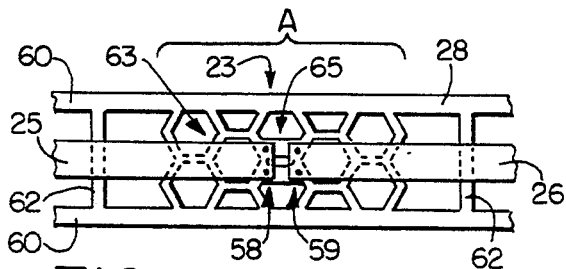
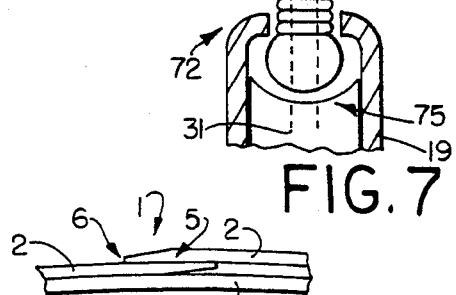
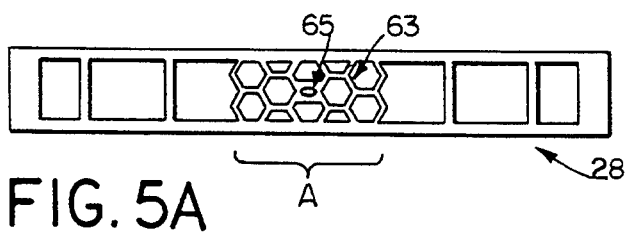
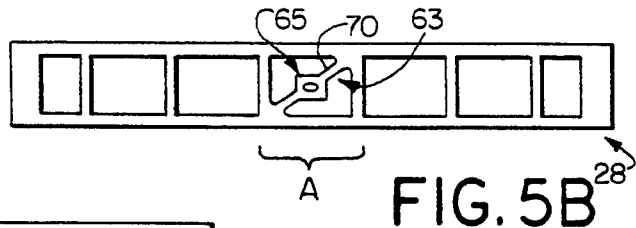
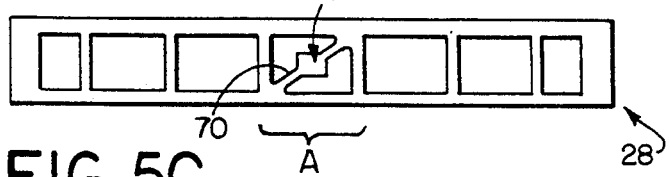
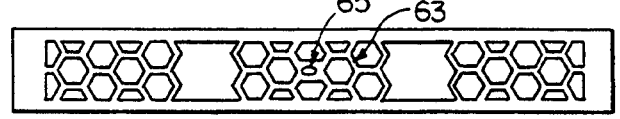
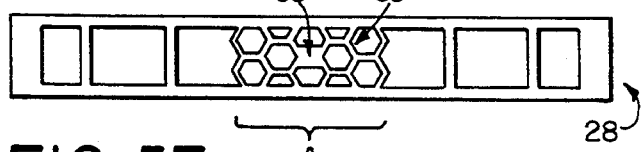
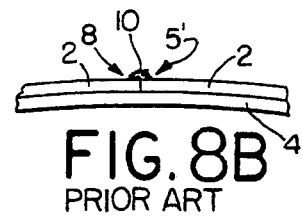

SURFACE TEMPERATURE PROBE WITH UNIFORM THERMOCOUPLE JUNCTION

TECHNICAL FIELD

The present invention relates generally to a surface temperature probe, and more particularly to a contacting-type surface temperature probe having a generally uniform thermocouple junction and improved flexibility.

BACKGROUND OF THE INVENTION

Surface temperature probes are known in the art. Contacting-type surface temperature probes are designed to be brought into contact with a surface in order to measure the temperature of the surface. For example, U.S. Pat. No. 4,859,081 describes a surface temperature probe which includes a thin plate spring with a thermocouple junction on a central portion thereof. The plate spring is fixed at both its ends to a support member so that the plate spring projects semicircularly in side elevation to form a temperature sensing portion. The semicircular plate spring and thermocouple junction are brought into contact with the surface to be measured and are pressed lightly against the surface to flatten slightly the semicircular portion of the plate spring. As a result, part of the plate spring and the thermocouple junction are engaged closely in press contact with the surface to be measured.

U.S. Pat. No. 4,279,154 describes a similar probe which utilizes a pair of foil strips of thermocouple materials which are butted or partly overlapped at their one ends to form a thermocouple junction thereat. The foil strips are overlaid across a plate spring including resilient support strips which provide contact pressure relative to the surface to be measured.

There are several drawbacks associated with conventional contact-type surface temperature probes. For example, FIG. 8a of the present application shows a conventional lap joint 1 formed between two thermocouple materials 2 on a resilient support strip 4. The lap joint 1 forms the thermocouple junction 5 which is to be engaged in press contact with the surface to be measured. The lap joint 1 results in a non-uniformity 6 in the thermocouple junction which prevents the thermocouple junction 5 from engaging uniformly in press contact with the surface to be measured, thereby introducing measurement error.

FIG. 8b of the present application illustrates a thermocouple junction 5' formed using a conventional butt joint 8 between the end surfaces of the thermocouple materials 2. The butt joint 8 is typically formed using a butt welder, for example, whereby the end surfaces of the thermocouple materials 2 are welded together. A problem arises however in that the end surfaces of the thermocouple materials typically have a very small surface area, e.g., on the order of four thousandths of an inch by one sixteenth of an inch. During welding of the butt joint 8, sputtering, flash, etc. can occur, thereby producing undesirable buildup at the joint 8. For example, a non-uniformity such as a burr 10 or the like may form on the surface of the butt joint 8. The burr 10 can prevent the thermocouple junction 5' from engaging in proper uniform contact with the surface to be measured, again introducing measurement error. As a result, another manufacturing step is necessary in order to remove the burr 10. Thus, additional manufacturing time and expense is necessary.

Still another drawback associated with conventional surface temperature probes is the use of an electrical insulating layer between the thermocouple materials and the spring plate. In the past, surface temperature probes have included a ceramic insulating layer approximately 20 microns thick between the thermocouple materials and the spring plate. Unfortunately, the ceramic layer can exhibit the normal brittle bulk properties associated with ceramic. This results in a probe tip which is likely to have reduced flexibility and thus be susceptible to damage due to, for example, the plate spring becoming overflexed and the ceramic layer breaking.

Yet another problem associated with conventional surface temperature probes is inadequate protection against overtravel of the thermocouple junction and spring plate. For example, a user may apply too much force applying the probe to the surface to be measured. As a result, the spring plate may flatten too far so as to permanently bend and/or break the plate spring or thermocouple junction. Conventional probes such as that described in the above-mentioned '081 patent attempt to overcome such a problem by including semicircular housing walls which substantially encircle the resilient contact surface. The housing walls limit the distance the spring plate and thermocouple junction can be deflected when pressed against a surface. However, such housing walls are not effective in the event surfaces are contacted which are smaller than the diameter of the housing walls, as in the case of screw heads, etc., or if the plate spring is pushed with a finger, etc. As a result, conventional surface temperature probes are still subject to damage due to overtravel of the spring plate, etc.

Still another drawback of conventional surface temperature probes relates to the thermal properties of the spring plate. A spring plate which is generally solid has a relatively high thermal mass which can adversely affect temperature measurements. As an alterative, the above-mentioned '154 patent describes a probe which uses a spring plate consisting of a pair of relatively thin resilient strips having cross members therebetween. The thermocouple materials are positioned across the cross members. The spring plate tends to have a lower thermal mass. However, such a spring plate does not ensure as large a contact area as the solid spring plate to ensure good contact between the thermocouple junction and the surface being measured. The cross members provide support to the thermocouple junction only in small, localized areas.

In view of the aforementioned shortcomings associated with conventional contact-type surface temperature probes, there is a need in the art for a surface temperature probe and a method of making such having a uniform thermocouple junction, particularly without requiring additional processing steps to remove non-uniformities. Moreover, there is a need in the art for a surface temperature probe having a ceramic insulating layer which does not exhibit the normal brittle bulk properties of ceramic. There is also a need for a surface temperature probe which includes means for preventing overtravel of the spring plate and/or thermocouple junction, even in the event of contact with a relatively small surface. Finally, there is a need for a spring plate for a surface temperature probe which provides support for a large contact area while still having a low degree of thermal mass.

SUMMARY OF THE INVENTION

The present invention relates to a contact-type surface temperature probe which has a generally uniform thermocouple junction. The thermocouple junction is formed by electrically joining each of the thermocouple elements or materials directly to the spring plate (also referred to herein as a spring flexure). The spring flexure is electrically conductive so that the thermocouple materials are not joined directly to each other as in a lap or butt joint. As a result, the thermocouple junction of the present invention has a more uniform, smooth contour for better contact with the surface. Manufacturing steps to remove burrs or other non-uniformities become unnecessary.

The surface temperature probe of the present invention also includes a thin film ceramic coating or layer providing electrical insulation between the spring flexure and the thermocouple materials except where the respective materials are electrically joined to the spring flexure. The thin film ceramic coating is superior to that found in existing temperature probes at least in that it is more flexible and does not exhibit the normal brittle bulk properties of ceramic.

Furthermore, the temperature probe of the present invention includes one or more posts positioned inside the tip of the probe. The posts prevent the thermocouple junction/spring flexure from traveling too far a distance so as to cause damage to the probe, even in the case of small surfaces. The temperature probe also includes a spring flexure which has, at least in pan, a generally lattice-like structure such as a honeycomb design. The lattice-like structure is designed to contact the thermocouple materials over a larger area to ensure good contact between the thermocouple materials and the surface being measured. At the same time, the lattice-like structure represents a minimal thermal mass in the spring flexure.

According to one particular aspect of the present invention, a surface temperature probe is provided which includes a spring flexure for providing a spring force in relation to a surface to be measured; and a temperature sensing element for generally contacting the surface as a function of the spring force, the temperature sensing element being positioned adjacent to the spring flexure with an electrically insulating thin film layer therebetween.

According to another aspect of the present invention, a surface temperature probe is provided which includes a spring flexure for providing a spring force in relation to a surface to be measured; and a thermocouple junction for generally contacting the surface as a function of the spring force, the thermocouple junction formed at least in part by a first and second thermocouple material, wherein the first and second thermocouple materials are each electrically connected to the spring flexure to form the thermocouple junction.

According to still another aspect of the present invention, a temperature probe is provided which includes a spring flexure for providing a spring force in relation to a surface to be measured, the spring flexure for undergoing deflection upon being pressed against the surface; and overtravel protection means towards which the spring flexure is deflected, wherein the overtravel protection means limits the amount of travel of the spring flexure to prevent damage to the temperature probe.

According to yet another aspect of the present invention, a spring flexure for a surface temperature probe is provided which includes a thin plate spring material having a generally lattice-like structure in an area adjacent a thermocouple junction in the probe.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is a fragmentary view of one form of surface temperature probe in accordance with the present invention;

FIG. 2 is a cross-sectional view of the surface temperature probe of FIG. 1 along lines 2—2 in accordance with the present invention;

FIG. 3 is an enlarged cross-sectional view of the surface temperature probe of FIG. 1 along lines 3—3 in accordance with the present invention;

FIG. 4a is a schematic side view of a thermocouple junction with a thin film insulator layer and spring flexure in accordance with the present invention;

FIG. 4b is a partial top view of a thermocouple junction in accordance with the present invention;

FIGS. 5a-5e are schematic top plan views of different embodiments of a spring flexure in accordance with the present invention;

FIG. 6 is a side elevation view of another embodiment of a post assembly for providing overtravel protection in accordance with the present invention;

FIG. 7 is a partial schematic side view of a surface temperature probe having a pivoting tip in accordance with another embodiment of the present invention; and FIGS. 8a and 8b are schematic side views of conventional lapped and butted thermocouple junctions, respectively.

DESCRIPTION OF THE PREFERRED EMBODIMENTS

The surface temperature probe of the present invention will now be described with reference to the drawings, wherein like reference numerals refer to like elements throughout.

Referring now to FIG. 1, a surface temperature probe 15 is shown for measuring the temperature of a surface 16. The temperature probe 15 includes a probe tip 18 mounted to one end of a shaft 19 having a handle 20 secured to the other end. The probe tip 18 includes a temperature sensing element 22 comprising a thermocouple junction 23. The thermocouple junction 23 is formed by an electrical connection between thermocouple materials 25 and 26. The thermocouple materials 25 and 26 are preferably metal ribbons mounted to a spring flexure 28. Each of the thermocouple materials 25 and 26 has an end which is electrically joined to a spring flexure 28 in the center portion of the spring flexure 28 to form the thermocouple junction 23 (FIGS. 4a and 4b). The opposite ends of the thermocouple materials 25 and 26 are secured within a housing 30 of the probe tip 18 as are the ends of the spring flexure 28. As a result, the thermocouple materials 25, 26 and the spring flexure 28 project semicircularly in side elevation as is shown in FIG. 2 such that the thermocouple junction 23 is located generally at the center of the arc. The non-joined ends of the thermocouple materials 25 and 26 are coupled via wires 31 or the like to provide connection to the appropriate support electronics (not shown) for the probe 15. The support electronics measure the actual temperature of the surface 16 using conventional thermocouple principles.

In use the thermocouple junction 23 is brought into heat and pressure contact with the surface 16. The spring flexure 28 adjacent the thermocouple junction 23 has a known degree of resiliency such that as the thermocouple junction 23 is brought into pressure contact with the surface 16, the thermocouple junction 23 and spring flexure 28 will tend to flatten. The spring flexure 28 thereby provides sufficient contact area and pressure between the thermocouple junction 23 and the surface 16.

A pair of laterally spaced semicircular walls 32 form part of the housing 30 between which the thermocouple materials 25 and 26 and spring flexure 28 are positioned. The height of the walls 32 relative to the base of the probe tip 18 is less than the highest part of the arcuate portion formed by the thermocouple junction 23 and spring flexure 28. Thus, when the thermocouple junction/spring flexure is pressed into contact with the surface 16, the thermocouple junction 23 and spring flexure 28 will undergo only a limited amount of deflection as the top of the walls 32 contact the surface 16.

The probe tip 18 includes a post assembly 35 which also prevents excessive deflection (i.e., overtravel) of the thermocouple junction 23 and spring flexure 28. The post assembly 35 is mounted in the base of the probe tip 18 between the walls 32 and includes a plurality of vertical projections or posts 37 (e.g., four). The posts 37 are made of a rigid material and are positioned directly beneath the spring flexure 28 and/or thermocouple junction 23 at a height equal to or less than that of the walls 32. As a result, even if the probe tip 18 is pressed into contact with a surface 16 which is smaller than the distance between the walls 32 (e.g., a surface such as a screw head, finger, etc.), the posts 37 will limit the amount of deflection of the thermocouple junction 23 and spring flexure 28.

In other words, as the spring flexure 28 is deflected in the direction indicated by arrow 40 in FIG. 2, the spring flexure 28 is deflected towards the tops of the posts 37. In the event the surface 16 is smaller than the distance between the walls 32, the spring flexure 28 will deflect only so far as to come into contact with the tops of the posts 37. The height of the posts 37 is preselected to prevent the spring flexure 28 and thermocouple junction 23 from deflecting too far so as to result in damage to the probe 15.

Referring to FIGS. 2 and 3, the details of the probe 15 are now described. The thermocouple materials 25 and 26 forming the thermocouple junction 23 are preferably ribbon materials made of thermocouple materials, respectively. For example, type K materials can be used to form the thermocouple. Moreover, other thermocouple materials such as type E, J, N and T materials can be used without departing from the scope of the invention. Exemplary dimensions for the ribbon-type thermocouple materials 25 and 26 are four thousandths of an inch thick by one sixteenth of an inch wide.

The spring flexure 28 is made of a resilient material such as Inconel (a trademark of Inco Alloys International) or stainless steel for example. The spring flexure 28 preferably is an electrically conductive material so as to provide an electrical connection between the thermocouple materials 25 and 26 as is described below with respect to FIG. 4a.

A thin film insulating layer 42 between the thermocouple materials 25 and 26 and the spring flexure 28 electrically insulates the thermocouple materials from the spring flexure 28, except for where the thermocouple materials are electrically joined to the spring flexure 28 as is described below with respect to FIG. 4a. By electrically isolating the thermocouple materials 25 and 26 except in the immediate area of the thermoconductive junction 23 at the center of the semicircular projection, more accurate temperature measurements can be obtained. Preferably the thin film layer 42 is a ceramic coating which is plasma vapor deposited, for example, on the top surface of the spring flexure 28 between the respective thermocouple material 25 or 26 and the spring flexure. Alternatively, the thin film ceramic coating can be deposited on the bottom surface of the respective thermocouple materials.

The thin film layer 42 preferably is made from a ceramic material such as alumina or zirconia. The thin film layer 42, if made of ceramic material, preferably has a thickness of approximately 13 microns or less. Ceramic layers having a thickness greater than approximately 13 microns begin to exhibit normal brittle bulk properties which can result in breakage of the temperature probe. Ideally, the thin film layer 42 is as thin as possible while still providing the desired electrical insulation. In the present invention, a ceramic thin film layer 42 having a thickness in the range of 0.1 to 10 microns is preferred, and a thickness in the range of 0.5 to 3 microns most preferred for giving optimum flexibility and insulation. Additional advantages of a ceramic thin film layer 42 as opposed to a thicker layer include reduced costs associated with less material expenses and reduced manufacturing time.

The post assembly 35 is secured to the probe tip 18 by a metal clamping plate 50 mounted to the housing 30 by screws 52 (FIG. 3). The post assembly 35 is preferably made of a rigid metal, ceramic or plastic material, the particular material depending on the temperatures at which the probe 15 is intended to be utilized. As previously mentioned, the post assembly 35 in the exemplary embodiment includes four separate vertical posts 37 each of which extends to a height equal to or less than the height of the walls 32. As shown in FIG. 3 in particular, the posts 37 are located directly beneath the spring flexure 28 such that the spring flexure 28 will deflect in the direction of arrow 40 towards the tops of the posts 37 upon being pressed into contact with the surface 16. The tops of the posts 37 will ultimately come into contact with the spring flexure 28 in the event the surface 16 is smaller than the diameter of the walls 32 and therefore limit the degree of travel of the spring flexure 28 and the thermocouple junction 23. Thus, regardless of whether the surface 16 is smaller than the diameter of the walls 32, the spring flexure 28 and thermocouple junction 23 are protected against overtravel.

It will be appreciated that the spring flexure 28 may itself be incorporated into the thermocouple materials 25 and 26 and not be a separate element. For example, the thermocouple materials 25 and 26 each may be made of a ribbon material or the like which itself has the desired degree of resiliency. This eliminates the need for a separate spring flexure 28 as shown. Nevertheless, the post assembly 35 of the present invention provides protection against over travel of the spring flexure 28 and thermocouple junction 23 regardless of whether the spring flexure is integral or discrete part in relation to the thermocouple materials.

The non-joined ends of the thermocouple materials 25 and 26 and the spring flexure 28 are secured in the housing 30 between the post assembly 35 and an insulating layer 54 of mica, silicone, fluorocarbon, or the like as shown in FIG. 2. The layer 54 is located on top of a support member 56 which, along with the post assembly 35, are stacked, clamped together, and securely held in the housing 30 by the clamping plate 50 and screws 52 (FIG. 3). The ends of the thermocouple materials 25 and 26 are connected to the wires 31 (FIG. 1) to provide connection to the support electronics in a conventional manner. Another insulating layer 55 made of mica, silicone or the like is included between the ends of the thermocouple materials 25 and 26 and the spring flexure 28 to provide additional isolation therebetween where clamping occurs.

FIG. 4a illustrates how the thermocouple materials 25 and 26 are joined to the spring flexure 28 in order to form the thermocouple junction 23 in accordance with the present invention. In the preferred embodiment, the thermocouple material 25 is joined at one end directly to the spring flexure 28 using, for example, spot welding, brazing, laser welding, etc., to form a joint 58 therebetween. In the area of the joint 58 there is no thin film layer 42 in order that the thermocouple material will be electrically connected to the spring flexure 28. Similarly, the thermocouple material 26 is joined directly to the spring flexure 28 using a spot weld or the like to form a joint 59.

Since the spring flexure 28 is electrically conductive, there exists an electrical connection between the thermocouple materials 25 and 26 without physically forming the thermocouple material 25 directly to the thermocouple material 26. Therefore, the thermocouple junction 23 of the present invention does not have the type of non-uniformities associated with a lap joint as in FIG. 8a or a butt joint as in FIG. 8b. The temperature probe 15 does not require a butt weld between the small end surfaces of the thermocouple materials as in the past. As a result, the problems associated with flash, sputtering, etc. at the end surfaces are avoided. The present invention does not suffer from and avoids the formation of burrs and the like which must be removed from conventional butt joints and result in added expense and manufacturing steps. Moreover, the present invention does not require that the ends of the thermocouple materials 25 and 26 undergo the extensive preparation necessary to obtain the precision surfaces required for forming a butt weld joint between the ends as will be appreciated. It will also be appreciated that although FIG. 4a shows a distance "d" between the respective end surfaces of the thermocouple materials 25 and 26, the end surfaces still could physically contact each other. However, a butt weld still is not required because the electrical connection is provided via the spring flexure 28.

Referring now to FIG. 4b, a top view of the spring flexure 28 in the area of the thermocouple junction 23 is shown. For clarity, the thin film layer 42 has been omitted. According to a preferred embodiment of the invention, the spring flexure 28 includes a pair of parallel resilient members 60 connected by cross members 62. The thermocouple materials 25 and 26 are positioned in parallel between the resilient members 60 and are supported by the cross members 62.

The area labelled "A" identifies the desired contact area of the temperature probe 15. The spring flexure 28 in the area A centered about the thermocouple junction 23 includes a resilient lattice-like structure 63 between the resilient members 60. The lattice-like structure 63 is intricately designed to contact the thermocouple materials 25 and 26 over a larger area as compared to conventional contact type probes. This ensures that there will be sufficient force exerted by the spring flexure 28 in the contact area A of the thermocouple junction 23 to provide sufficient contact between the thermocouple materials and the surface 16 being measured. At the same time, the thin webs of the intricate lattice-like structure 63 minimize the thermal mass of the spring flexure 28. As a result, the temperature probe 15 can provide accurate measurements even in the case where the surface 16 has a relatively low thermal mass.

The center of the lattice-like structure 63 includes a pad 65 which serves as a surface area on the spring flexure 28 to which the ends of the thermocouple materials 25 and 26 are desirably welded or otherwise directly joined. For this reason the pad 65 preferably does not include the thin film insulating layer 42. The pad 65 itself can have different shapes and sizes, the object being to provide sufficient surface area to join the thermocouple materials to the pad 65. The spring flexure 28 may be chemically milled, laser machined, stamped, etc. from spring metal and coated, either before or after bending, if desired, as will be appreciated. As mentioned above, the thin film insulating layer 42 can be formed on the surface of the spring flexure 28 via plasma vapor deposition or the like. Masking can be used to prevent deposit of the thin film layer 42 on the pad 65. Alternatively, the entire surface of the spring flexure 28 can be coated initially via plasma vapor deposition or the like and the pad 65 then exposed using abrasive blasting to remove the deposit.

FIGS. 5a–5e show a number of additional embodiments of the spring flexure 28 in accordance with the present invention. Each embodiment includes a lattice-like structure 63 in the area A for providing good surface contact while still exhibiting relatively low temperature mass. FIGS. 5a, 5d and 5e illustrate a lattice-like structure having a preferred honeycomb design. FIG. 5d in particular includes a lattice-like structure near the ends of the spring flexure 28 to provide even further support. FIGS. 5b and 5c show a lattice-like structure having a diagonal member 70 for providing structural strength, good surface contact, and low temperature mass. Other designs for the lattice-like structure are also possible as will be appreciated in view of the present disclosure.

Referring now to FIG. 6, another embodiment of the post assembly 35 is shown. In this embodiment, the post assembly comprises a single wide post 37' as opposed to the smaller four posts 37 shown in FIG. 1. The post 37' also protects against overtravel of the spring flexure 28. A disadvantage associated with the single wide post 37', however, is that at high temperatures the temperature radiation of the post 37' may affect temperature measurements. Therefore, a plurality of smaller posts 37 such as those in the embodiment of FIG. 1 are believed to provide superior high-temperature operation due to better thermal radiation characteristics, i.e., view factor, etc.

FIG. 7 illustrates another embodiment of the present invention in which the probe tip 18 is pivotably mounted to the shaft 19. More particularly, the probe tip 18 is attached to the shaft 19 via a ball and socket assembly 72. By pivotably mounting the probe tip 18 to the shaft 19, the temperature probe 15 can be used to measure surfaces which are difficult to access normally, are slanted, etc. A hole 75 in the ball and socket assembly 72 provides the wires 31 a path to the thermocouple materials 25 and 26.

Still another feature of the invention is shown with respect to FIGS. 2 and 3. The housing 30 with walls 32 and base portion 80 has a U-shaped cross-section. The height of the walls 32 is designated by "H", and the thickness of the walls 32 is designated "T". It has been found that a height-to-thickness ratio of twelve or more results in increased accuracy of the probe 15. By making the height to thickness ratio twelve or more, it is believed that there is better thermal isolation between the clamping materials in the probe tip 18, e.g., plate 50, layer 54, member 56, etc., and the surface 16 being measured. As a result, the effect that the probe 15 has on the temperature of the surface 16 is minimized.

Although the invention has been shown and described with respect to certain preferred embodiments, it is obvious that equivalents and modifications will occur to others skilled in the art upon the reading and understanding of the specification.

For example, the thin film insulating layer and overtravel protection features of the present invention have been described primarily in the context of a surface temperature probe using a thermocouple junction 23 as the temperature sensing element 22 adjacent the spring flexure. It will be appreciated, however, that these features have utility with surface temperature probes having a different type of temperature sensing elements adjacent the spring flexure in place of the thermocouple junction 23. For example, a different embodiment of the present invention will have a thermistor or a resistor temperature detector (RTD) as the temperature sensing element 22. The thin film insulating layer 42 between the thermistor/RTD and the spring flexure 28 provides electrical isolation therebetween while still avoiding the bulk properties of a non-thin film layer. Similarly, the post assembly 35 protects against overtravel of the spring flexure 28 in the case of a thermistor or RTD-type temperature sensing element as well as in the case of a thermocouple junction.

The present invention includes all such equivalents and modifications, and is limited only by the scope of the following claims.

What is claimed is:

1. A temperature probe, comprising:
an electrically conductive spring flexure for providing a spring force in relation to a surface to be measured; and
a temperature sensing element for generally contacting said surface as a function of said spring force, said temperature sensing element being positioned adjacent to said spring flexure with an electrically insulating thin film layer therebetween, said thin film layer having a thickness of up to about 13 microns.

2. The temperature probe of claim 1, said thin film layer comprising a ceramic material.

3. The temperature probe of claim 2, wherein said ceramic material comprises a material selected from the group consisting of alumina and zirconia.

4. The temperature probe of claim 2, wherein said thin film layer has a thickness within the range of 0.1 to 10 microns.

5. The temperature probe of claim 4, wherein said thin film layer has a thickness within the range of 0.5 to 3 microns.

6. The temperature probe of claim 1, wherein said thin film layer is plasma vapor deposited on said spring flexure.

7. The temperature probe of claim 1, wherein said temperature sensing element is a thermocouple junction formed at least in part by first and second thermocouple materials electrically connected directly to said spring flexure to form said thermocouple junction between said thermocouple materials.

8. The temperature probe of claim 7, wherein said spring flexure includes a pad, and said first and second thermocouple materials are each in the shape of a ribbon having a respective end connected to said pad.

9. The temperature probe of claim 8, wherein said respective ends are connected to said pad by at least one of spot welding, laser welding and brazing.

10. The temperature probe of claim 7, wherein said first and second thermocouple materials are physically separate from each other.

11. The temperature probe of claim 7, wherein said thermocouple junction comprises two dissimilar metals of a type selected from a group consisting of type K, E, J, N and T metals.

12. The temperature probe of claim 1, wherein said spring flexure undergoes deflection upon being pressed against said surface to be measured, and said temperature probe further comprising overtravel protection means which said spring flexure is deflected directly towards, said overtravel protection means limiting the amount of travel of said spring flexure to prevent damage to said temperature probe.

13. The temperature probe of claim 12, wherein said overtravel protection means comprises at least one post positioned on a side of said spring flexure opposite that of said surface to be measured.

14. The temperature probe of claim 13, wherein said at least one post is made of at least one of metal, ceramic and plastic.

15. The temperature probe of claim 12, wherein said overtravel protection means comprises a plurality of posts positioned on a side of said spring flexure opposite that of said surface to be measured.

16. The temperature probe of claim 1, wherein said spring flexure comprises a thin plate spring material having a generally entricate lattice-like structure in an area adjacent said temperature sensing element.

17. The temperature probe of claim 16, wherein said lattice-like structure is a honeycomb structure.

18. The temperature probe of claim 16, said thin plate spring material further comprising a pad to which a first and second thermocouple material is electrically connected to form said temperature sensing dement.

19. The temperature probe of claim 1, further comprising a protective housing partially enclosing said spring flexure, said housing having walls with a height-to-thickness ratio of at least twelve.

20. A temperature probe, comprising:
a spring flexure for providing a spring force in relation to a surface to be measured;

a thermocouple junction for generally contacting said surface as a function of said spring force, said thermocouple junction formed at least in part by first and second thermocouple materials, wherein said first and second thermocouple materials are each electrically connected to said spring flexure to form said thermocouple junction through said spring flexure; and wherein said first and second thermocouple materials are each in the shape of a ribbon having a respective end connected to a pad on said spring flexure.

21. The temperature probe of claim 20, wherein said respective ends are connected to said pad by at least one of spot welding, laser welding and brazing.

22. A temperature probe, comprising:
a housing;
a spring flexure for providing a spring force in relation to a surface to be measured, said spring flexure undergoing deflection toward a bottom wall of said housing upon being pressed against said surface;
a temperature sensing element positioned relative to said spring flexure; and
overtravel protection means projecting from said housing and which said spring flexure is deflected directly towards, wherein under normal operating conditions a space exists between said overtravel protection means and said spring flexure and wherein said overtravel protection means limits the amount of travel of said spring flexure to prevent damage to said temperature probe.

23. The temperature probe of claim 22, wherein said overtravel protection means comprises at least one post positioned on a side of said spring flexure opposite that of said surface to be measured.

24. The temperature probe of claim 23, wherein said at least one post is made of at least one of metal, ceramic and plastic.

25. The temperature probe of claim 22, wherein said overtravel protection means comprises a plurality of posts positioned on a side of said spring flexure opposite to that of said surface to be measured.

26. The temperature probe of claim 22, said spring flexure being located at a tip of said temperature probe, said tip being pivotably mounted to a support member.

27. A temperature probe comprising a spring flexure, said spying flexure comprising a thin plate spring material having a generally intricate lattice-like structure formed of thin webs in an area adjacent a thermocouple junction in said probe, said intricate lattice-like structure facilitating contact between said thermocouple junction and a surface being measured.

28. The spring flexure of claim 27, wherein said lattice-like structure is a honeycomb structure.

29. A method of making a thermocouple junction for a temperature probe, comprising the steps of:
electrically connecting a first ribbon shaped thermocouple material directly to a spring flexure, said spring flexure being electrically conductive; and
electrically connecting a second ribbon shaped thermocouple material directly to said spring flexure to create at least in part a thermoelectric junction between said first and second thermocouple materials through said spring flexure.

30. The method of claim 29, further comprising the step of introducing an electrically insulating thin film layer between said first and second thermocouple materials and said spring flexure except where said first and second thermocouple materials are electrically connected to said spring flexure.

* * * * *